United States Patent

[11] 3,634,756

| | | | |
|---|---|---|---|
| [72] | Inventor | Robert L. Carlise Costa Mesa, Calif. | |
| [21] | Appl. No. | 17,547 | |
| [22] | Filed | Mar. 9, 1970 | |
| [45] | Patented | Jan. 11, 1972 | |
| [73] | Assignee | North American Rockwell Corporation | |

[54] RF-EXCITED TRANSDUCER
1 Claim, 3 Drawing Figs.

[52] U.S. Cl........................................................ 324/58.5, 324/84
[51] Int. Cl........................................................ G01r 27/04
[50] Field of Search............................................. 324/58.5 A, 84, 58.5 B

[56] References Cited
UNITED STATES PATENTS
3,399,345  8/1968  Cohn............................ 324/84
3,221,251  11/1965  Margerum et al. ............ 324/84
3,117,276  1/1964  Beyer et al..................... 324/58.5 B

*Primary Examiner*—Alfred E. Smith
*Attorneys*—L. Lee Humphries, H. Frederick Hamann and Rolf M. Pitts ABSTRACT: RF carrier wave excited transducer means for providing a bipolar output signal having a sense and magnitude indicative of the sense and magnitude of a detected change of state from a reference state and corresponding to a fractional wavelength of the carrier wave. Modulating means responsive to a detected state modulates an applied carrier wave excitation as a function of the detected state. Hybrid junction means responsive to the applied carrier and to the modulated carrier provides two RF outputs in mutual time phase quadrature. Detected signal summing means having oppositely poled first and second detected inputs, each responsive to a respective one of said hybrid junction outputs, provides a bipolar output indicative of the difference between said hybrid outputs.

INVENTOR.
ROBERT L. CARLISE

BY

ATTORNEY

RF-EXCITED TRANSDUCER

BACKGROUND OF THE INVENTION

The field of the subject invention pertains to microwave interferometers for measuring a change in state of a sample material, such as a change in thickness thereof, corresponding to a fraction of a microwave wavelength.

In the prior art of material measurement by microwave means, it is known to utilize variations in the time phase of a reflected radio wave, corresponding to a spatial modulation or change in dimension, to determine such dimension or change in dimension, as variously indicated by the following U.S. Pats.:

No. 3,025,463 to Luoma, et al.
No. 3,102,232 to Leonard, et al.
No. 3,117,276 to Beyer, et al.
No. 3,258,688 to Augustine, et al.
No. 3,482,160 to Prine.

However, such prior art devices either do not provide an output having a sense indicative of the sense of the change of state from a reference state, or else require an inordinate amount of equipment to obtain such data. For example, U.S. Pat. No. 3,025,463 to E. J. Luoma et al.; U.S. Pat. No. 3,102,232 to J. D. Leonard, et al.; and U.S. Pat. No. 3,482,160 to Prine do not teach or suggest means for determining the sense of a change in detected state or dimension from a reference state or dimension. Although U.S. Pat. No. 3,117,276 to J. B. Beyer, et al. and U.S. Pat. No. 3,258,688 to C. F. Augustine, et al. show means for effecting an output signal indicative of the sense (as well as magnitude) of a deviation from a reference state, each requires an inordinate amount of equipment to effect such control signal. Beyer, et al., for example, employs two detectors (one on either side of a material to be measured) to effect a measurement, a reference dimension signal source, and a difference amplifier to provide a signal indicative of the difference between such dimension and the reference. Augustine, et al., similarly employs detectors on opposite sides of the object material; in addition, Augustine employs a sawtooth-modulator driven klystron, the sawtooth reference being driven in synchronism with a reference oscillator, employed as a phase reference of a phase-sensitive detector. In other words, both of Augustine and Beyer require extensive ancillary electronics auxiliary to the microwave sensor means for effecting dimension measurement or control, which auxiliary electronics tends to require extensive calibration, even for a given reference condition, due to aging of circuit components.

Thus, the prior art does not provide simple microwave circuit means for effecting a bipolar control signal, indicative of the sense as well as the magnitude of a deviation from a preselected state.

SUMMARY OF THE INVENTION

By means of the concept of the subject invention, the above-noted shortcomings of the prior art are avoided and there is provided RF carrier wave excited transducer means providing a bipolar output signal indicative of both the sense and magnitude of a detected change of state from a reference state and corresponding to a fractional wavelength of the carrier wave.

In a preferred embodiment of the invention, there is provided modulating means responsive to a detected state for modulating an applied RF carrier wave excitation as a function of the detected state. Hybrid junction means, responsive to the applied carrier and to the modulated carrier, provides two RF outputs in mutual time phase quadrature. Detected signal summing means having oppositely poled first and second detected inputs responsive to a respective one of the hybrid junction outputs, provides a bipolar output indicative of the difference between the hybrid outputs.

In normal operation of the above-described arrangement, the gain and phase of one of the hybrid outputs is selectively adjusted by calibration means to effect a null output from the detected signal summing means for a selected detected state, corresponding to a calibrated condition. Detected deviations or changes from such state or calibrated condition are then indicated by the summing means output signal varying from a null condition, the sense and magnitude of the signal corresponding to the sense and magnitude of the detected change in state. Such bipolar signal is thus obtained without the necessity of either a bias or reference signal generator or extensive processing circuitry.

Accordingly, it is an object of the invention to provide an improved RF-excited transducer.

It is another object to provide a RF-excited transducer system having a bipolar output indicative of the sense and magnitude of a detected deviation from a selected state.

A further object is to provide bipolar signalling means in a RF-excited transducer without employing a separate bias signal source to indicate a reference state.

These and further objects of the invention will become apparent from the following description, when taken together with the accompanying drawings, in which:

BRIEF DESCRIPTION OF THE DRAWINGS

In the FIGS., like reference characters refer to like parts.

DESCRIPTION OF THE PREFERRED EMBODIMENTS

Figure 1:
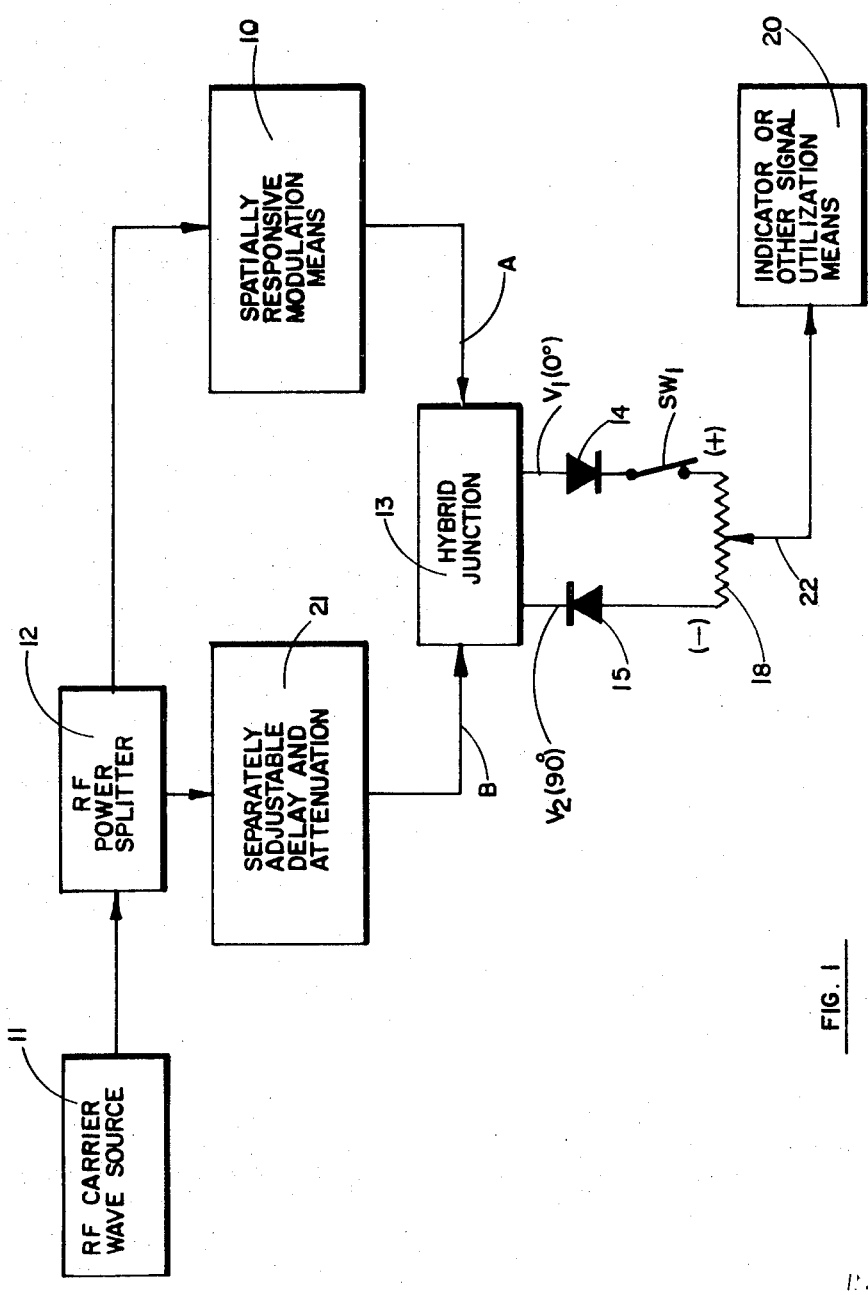
FIG. 1 is a block diagram of a system embodying the concept of the invention.

Referring now to FIG. 1, then is illustrated a block diagram of a system embodying the concept of the invention. There is provided RF carrier excited state-sensitive means 10, coupled to a source 11 of a RF carrier wave by means of a RF power splitter 12, for providing a modulated RF carrier output as a first input A to a hybrid junction 13. Such modulation means 10 may include spatially responsive means for effecting amplitude modulation or time phase modulation or both of the fixed frequency carrier wave as a function of the change in dimension or thickness of a material to be measured. Alternatively, such modulation means may be responsive to a change in the dielectric properties or material of a geometrically stable substance. Still further, modulation means 10 may be responsive to a combination of changes of properties to provide a modulation indicative of a detected state or condition of a sample under observation.

A second input $B$ of hybrid junction 13 is responsively coupled by power splitter 12 to power source 11. The RF inputs to hybrid junction 13 are combined to provide two outputs, $V_1$ and $V_2$, each of which varies as a periodic function of a detected change in state to which modulation means 10 responds. Hybrid junction 13 may be a four-port 3 db. sidewall coupler for providing a first output indicative of the sum of the two inputs thereto ($V_1=A+B$), and a second output indicative of the difference between the two input thereto ($V_2=A-B$) such outputs being effected by appropriate phase shifting and combining of the inputs, as is well understood in the art. The principles of a sidewall hybrid to effect such combinings of microwave signals is well understood in the monopulse radar art, for example, and is explained in U.S. Pat. No. 3,071,769 issued to G. M. Randall, et al., for a Four Horn Feed Bridge.

Figure 2:
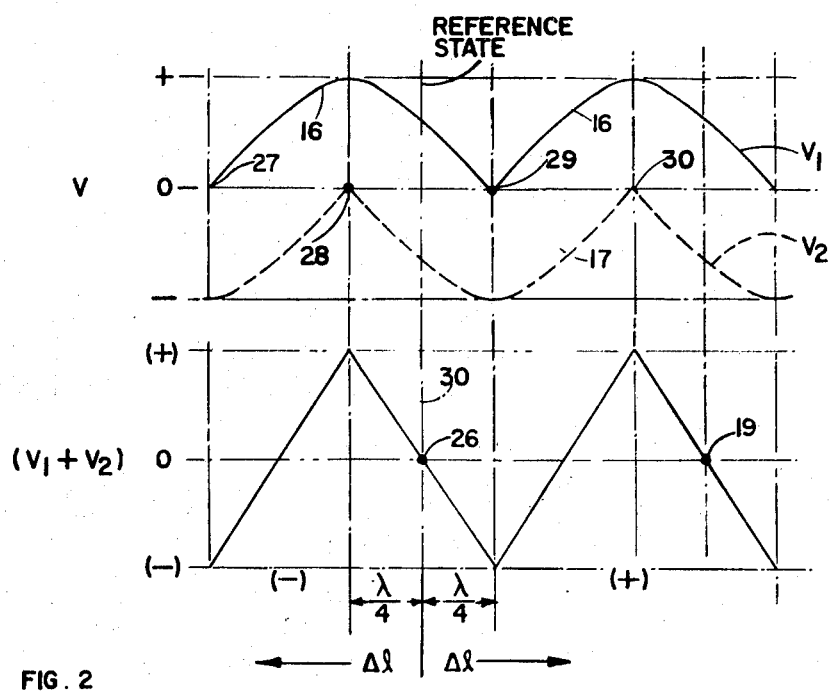
FIG. 2 is a family of time histories, illustrating the responses of various elements of the system of FIG. 1.

By means of oppositely poled diode detectors 14 and 15, each responsive to a respective one of RF outputs $V_1$ and $V_2$, a first and second detected signal is obtained, as indicated by curves 16 and 17 in FIG. 2. The first detected signal, $V_1$ may be indicative of the sum, $+(A+B)$, while the second detected signal may be indicative of the difference, $-(A-B)$.

The amplitudes of the oppositely poled signals $V_1$ and $V_2$ are seen to vary periodically as functions of the time phase or spatial modulation imparted by modulation means 10, a quadrature phase relationship existing between curves 16 and 17 due to the differential time phase bias inserted by hybrid junction 13. In other words, the quadrature time phase differential bias interposed by hybrid junction 13 corresponds to a quarter-wave displacement between signals $V_1$ and $V_2$. By summing oppositely poled detected signals $V_1$ and $V_2$ by means of a resistive summing network (comprising the three terminals of a potentiometer 18) in FIG. 1, a bipolar signal is obtained, corresponding to curve 19 in FIG. 2. Curve 19 is seen to also be a periodic function of space phase, reaching a null or crossover point 26 where the amplitudes of the oppositely poled detected signals $V_1$ and $V_2$ are equal, as may be indicated by an indicator 20 or other signal utilization means (in FIG. 1).

The maxima of curves 16 and 17 may be made more nearly equal about an operating point or reference state of interest by means of selectively adjustable attenuation means 21 interposed in circuit between power splitter 12 and the B input of hybrid junction 13 or by adjustment of the variable center tap 22 of summing means 18. In addition, any necessary phase bias to assure calibration about a selected reference state may also be inserted by an adjustable phase shift provided by calibration means 21.

In other words, the adjustable bias element 21 of FIG. 1 is employed to compensatorily adjust the state of input B to one offsetting or nulling out a preselected state of input B, corresponding to a reference state of interest of modulation means 10.

Figure 3:
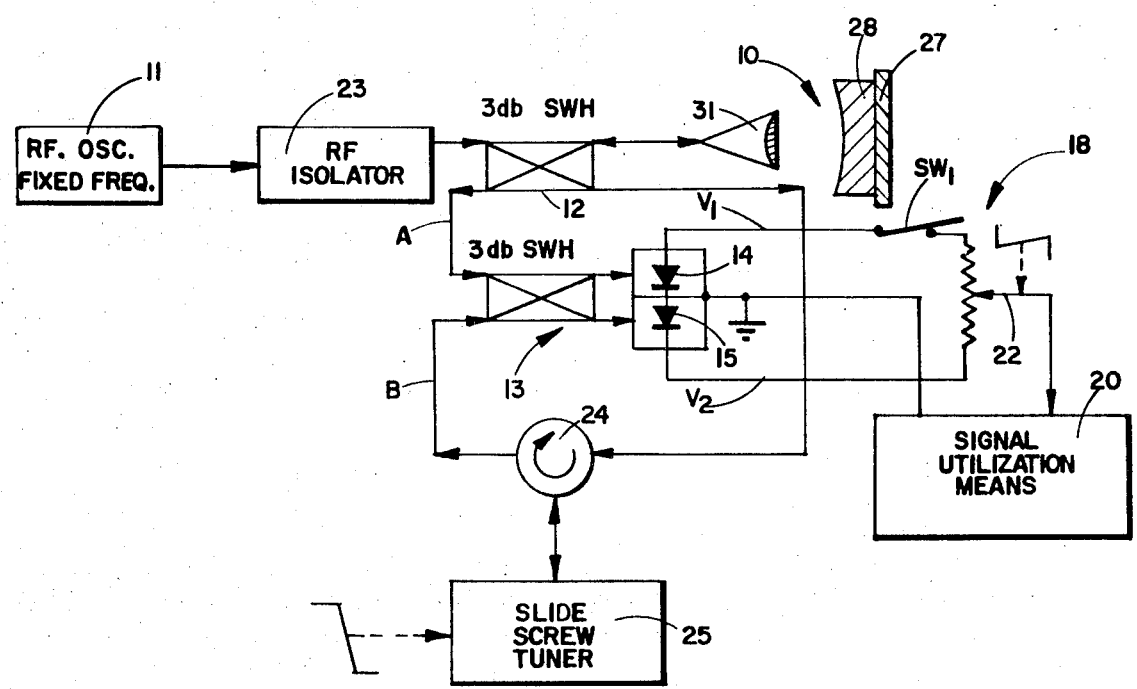
FIG. 3 is a schematic arrangement of a preferred embodiment of the system of FIG. 1.

The system concept of FIG. 1 is shown in greater particularity in the preferred embodiment of FIG. 3. In such embodiment of FIG. 3, a 3 db. hybrid sidewall coupler or dual microwave bridge is employed as the power splitter 12 of FIG. 1, and an RF isolator 23 is employed to prevent load variation and consequent frequency pulling of oscillator 11 due to state changes of modulation means 10. In other words, a constant frequency excitation is desired. Modulation means 10 is shown to comprise a focusable feedhorn 26 in cooperation with a metal plate or radio-energy reflective surface 27, for reflection of energy through a dielectric material of interest numeral 31. Such focusing may be conveniently effected by use of a suitable dielectric lens insert, as is well understood in the art. Adjustable biasing means 21 is comprised of a circulator 24 interposed in circuit between an output of hybrid 12 and the corresponding input of hybrid 13, an intermediate port of circulator 24 being connected in circuit to a slide screw tuner 25.

Hybrid junction 13 includes an RF diode 14 and 15 in each of two output guide sections for providing a first and second oppositely poled detected output, as shown in greater detail in the partially torn away perspective view of FIG. 4.

Although the calibration of the system of FIG. 1, of which the arrangement of FIG. 3 is a preferred embodiment, has been described in terms of adjustment of crossover point 26 of curve 19 in FIG. 2, such calibration may be more conveniently involve adjustment of the observed null points 27 and 29 of curve 16 or null points 28 and 30 of curve 17 in FIG. 2, and corresponding to the component responses resulting in the composite response of curve 19. Calibration or adjustment of the location of the quarter-wave distance from a reference state and corresponding to point 29 of curve 19 (or point 28 of curve 17) for example, may be achieved by opening switch $SW_1$ (in FIG. 2) when modulation means 10 is near a selected or reference state, and then adjusting alternately the phase bias and attenuation injected by slide screw tuner 25 until a null point (corresponding to point 28 of FIG. 2, for example) is observed by signal utilization means 20. The null condition of the nodal point 28 thus indicates that the amplitudes of component microwave inputs A and B to hybrid means 13 are now balanced, as observed at the output $V_2$ of hybrid means 13. Next, switch $SW_1$ is closed, whereby output $V_1$ is combined with output $V_2$ at potentiometer 18. With switch $SW_1$ now closed and modulation means 10 still in the reference state, the phase setting of tuner 25 is adjusted until the combination of oppositely poled outputs $V_1$ and $V_2$ produces a null reading, corresponding to the relocation of curves 16, 17 and 19 such that crossover point 26 of composite response 19 is coincident with reference line 30 (corresponding to the reference state of modulator means 10).

With the transducer system now calibrated to a selected reference state of modulator means 10, any state deviation from such selected state of modulator means 10 will result in a detected output signal at potentiometer output 22 and having a sense and magnitude indicative of such change, the signal magnitude being substantially proportional to the magnitude of the change of state up to changes corresponding to a quarter wavelength.

Accordingly, there has been described a RF-excited transducer employing a single RF horn to radiate part of a reference signal and which receives reflections of the radiated portion, the received reflections and a sampled portion of the reference signal being detected and compared to effect an indication of a change in the reflective conditions from a selected reflective condition. Such device utilizes a minimum of components as to be inexpensive to manufacture and highly reliable in use.

Although the invention has been described and illustrated in detail, it is to be clearly understood that the same is by way of illustration and example only and is not to be taken by way of limitation, the spirit and scope of this invention being limited only by the terms of the appended claims.

I claim:

1. An RF carrier excitable position transducer comprising
   a first sidewall hybrid having a first port connected by an RF isolator to a source of a fixed frequency RF carrier wave, a second port connected in circuit with an RF radiating aperture, and further having a third and fourth port;
   a second sidewall hybrid having a first and second input port responsively coupled to a respective one of said third and fourth ports of said first sidewall hybrid, and further having a third summing output port and a fourth difference output port quadrature time phase shifted relative to said third summing output port;
   oppositely poled first and second detector means responsive to a respective one of said third summing and fourth difference output ports of said second sidewall hybrid for providing a respective first and second detected signal of mutually opposite polarity; and
   output signal summing means responsive to said first and second detected signals for providing an output signal indicative of the algebraic sum of said detected signals;
   calibration means for calibrating said transducer relative to a selected reference position of interest, and comprising
       said output signal summing means, said signal summing means being a potentiometer having an output wiper and further having a two-terminal resistive element, each of the two terminals of which are connected in circuit to a respective one of said oppositely poled detector means,
       a normally closed switch interposed in series circuit between one of said terminals and an associated detector means, a slide screw tuner interposed in series circuit between said first and second sidewall hybrids by means of a circulator having at least three ports for adjusting the relative time phase between the two inputs of said second sidewall hybrid, said output signal summing means including means for adjusting the relative attenuation between the two detected signals applied thereto.

* * * * *